(12) United States Patent
Iijima et al.

(10) Patent No.: US 12,309,676 B2
(45) Date of Patent: May 20, 2025

(54) NETWORK SYSTEM AND NETWORK SLICE GENERATION METHOD

(71) Applicant: Hitachi, Ltd., Tokyo (JP)

(72) Inventors: Tomoyuki Iijima, Tokyo (JP); Masayuki Takase, Tokyo (JP); Shiro Mazawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 383 days.

(21) Appl. No.: 17/945,640

(22) Filed: Sep. 15, 2022

(65) Prior Publication Data
US 2023/0319531 A1 Oct. 5, 2023

(30) Foreign Application Priority Data

Apr. 5, 2022 (JP) .................................. 2022-062874

(51) Int. Cl.
  *H04W 4/50* (2018.01)
  *H04L 61/4511* (2022.01)
  *H04W 28/16* (2009.01)
(52) U.S. Cl.
  CPC ........... *H04W 4/50* (2018.02); *H04L 61/4511* (2022.05); *H04W 28/16* (2013.01)
(58) Field of Classification Search
  CPC ...... H04W 4/50; H04W 28/16; H04L 61/4511
  USPC ..................................................... 455/414.1
  See application file for complete search history.

(56) References Cited

U.S. PATENT DOCUMENTS

2022/0377650 A1* 11/2022 Kotaru .................. H04W 24/10

FOREIGN PATENT DOCUMENTS

JP 2019-041266 A 3/2019

OTHER PUBLICATIONS

ETSI TR 38.913 V16.0.0: "Study on Scenarios and Requirements for Next Generation Access Technologies", (3GPP TR 38.913 version 16.0.0 Release 16) Jul. 2020.

* cited by examiner

*Primary Examiner* — Joel Ajayi
(74) *Attorney, Agent, or Firm* — Volpe Koenig

(57) ABSTRACT

A network system comprises a communication facility, and a management apparatus. The communication facility includes a wireless base station, a data processing apparatus, and communication processing apparatuses. The management apparatus manages resource management information for managing, as a resource, a value of an item to be set for the communication facility to generate a network slice for each of characteristics of the network slice. The management apparatus generates the network slice, refers, based on a characteristic of the network slice, to the resource management information to determine the value of the item and transmits, to the communication facility, first setting information for setting the determined value of the item. The management apparatus generates a transfer rule by associating identification information on a wireless terminal and identification information on the data processing apparatus with each other and transmits, to the communication facility, second setting information for setting the transfer rule.

8 Claims, 13 Drawing Sheets

| | | 962 | | 96 |
|---|---|---|---|---|
| 961 | | QUALITY CONDITION | | |
| TYPE | LATENCY | COMMUNICATION SPEED | ... |
| LARGE CAPACITY | 100ms | 200MB | ... |
| LOW LATENCY | 10ms | 50MB | ... |
| SIMULTANEOUS MULTIPLE COUPLING | 50ms | 100MB | ... |
| ⋮ | ⋮ | ⋮ | ⋮ |

| 911 | 912 | 913 | 914 | 91 |
|---|---|---|---|---|
| RESOURCE NAME | START | END | INCREMENT | |
| VLAN | 10 | 250 | 1 | |
| SUBNET | 192.168.10.0/24 | 192.168.250.0/24 | 10 | |
| IP ADDRESS | 192.168.10.1 | 192.168.10.250 | 1 | |
| ⋮ | ⋮ | ⋮ | ⋮ | |

| TYPE | DATA NETWORK | VLAN ID | SUBNET | APPARATUS NAME | IP ADDRESS |
|---|---|---|---|---|---|
| LOW LATENCY | network1 | 10 | 192.168.10.0/24 | DESTINATION DETERMINATION APPARATUS 40a | 192.168.10.1 |
| | | | | VIRTUAL DATA PROCESSING APPARATUS 100a | 192.168.10.2 |
| | network2 | 40 | ... | ... | ... |
| LARGE CAPACITY | network3 | 20 | 192.168.10.0/24 | DESTINATION DETERMINATION APPARATUS 40b | 192.168.20.1 |
| | | | | VIRTUAL DATA PROCESSING APPARATUS 100b | 192.168.20.2 |
| | network4 | 50 | ... | ... | ... |
| SIMULTANEOUS MULTIPLE COUPLING | network5 | 30 | 192.168.10.0/24 | DESTINATION DETERMINATION APPARATUS 40a | 192.168.30.1 |
| | | | | VIRTUAL DATA PROCESSING APPARATUS 100c | 192.168.30.2 |
| | network6 | 60 | ... | ... | ... |
| ... | ... | ... | ... | ... | ... |

FIG. 5

| 931 | 932 | 93 |
|---|---|---|
| TRANSMISSION SOURCE | DESTINATION | |
| 60.60.10.0/24 | 192.168.10.0/24 | |
| 60.60.20.0/24 | 192.168.20.0/24 | |
| ⋮ | ⋮ | |
| Any | 192.168.0.0/24 | |

*FIG. 6*

| 941 | 942 | 94 |
|---|---|---|
| DOMAIN NAME | IP ADDRESS | |
| aaa.abc.co.jp | 192.168.10.2 | |
| bbb.abc.co.jp | 192.168.10.3 | |
| ⋮ | ⋮ | |

*FIG. 7*

| 951 | 952 | | 95 |
|---|---|---|---|
| DATA PROCESSING APPARATUS ID | COMMUNICATION QUALITY | | |
| | LATENCY | COMMUNICATION SPEED | ... |
| 192.168.0.251 | 50ms | 100MB | ... |
| 192.168.0.252 | 10ms | 50MB | ... |
| 192.168.0.253 | 100ms | 200MB | ... |
| ⋮ | ⋮ | ⋮ | ⋮ |

*FIG. 8*

| TYPE | QUALITY CONDITION | | ... |
| --- | --- | --- | --- |
| | LATENCY | COMMUNICATION SPEED | |
| LARGE CAPACITY | 100ms | 200MB | ... |
| LOW LATENCY | 10ms | 50MB | ... |
| SIMULTANEOUS MULTIPLE COUPLING | 50ms | 100MB | ... |
| ⋮ | ⋮ | ⋮ | ⋮ |

FIG. 9

| DATA PROCESSING APPARATUS ID | VIRTUAL DATA PROCESSING APPARATUS ID |
| --- | --- |
| 192.168.0.251 | 192.168.10.2 |
| 192.168.0.252 | ~ |
| 192.168.0.253 | ~ |
| ⋮ | ⋮ |

FIG. 10

| TYPE | DATA NETWORK | VLAN ID | SUBNET | APPARATUS NAME | IP ADDRESS |
|---|---|---|---|---|---|
| LOW LATENCY | network1 | 70 | 192.168.70.0/24 | DESTINATION DETERMINATION APPARATUS 40a | 192.168.70.1 |
| | | | | VIRTUAL DATA PROCESSING APPARATUS 100d | 192.168.70.2 |
| | network2 | 40 | ... | ... | ... |
| LARGE CAPACITY | network3 | 20 | 192.168.10.0/24 | DESTINATION DETERMINATION APPARATUS 40b | 192.168.20.1 |
| | network4 | 50 | ... | VIRTUAL DATA PROCESSING APPARATUS 100b | 192.168.20.2 |
| SIMULTANEOUS MULTIPLE COUPLING | network5 | 30 | 192.168.10.0/24 | DESTINATION DETERMINATION APPARATUS 40a | 192.168.30.1 |
| | network6 | 60 | ... | VIRTUAL DATA PROCESSING APPARATUS 100c | 192.168.30.2 |
| ... | ... | ... | ... | ... | ... |

| TRANSMISSION SOURCE | DESTINATION |
|---|---|
| 60.60.10.0/24 | 192.168.70.0/24 |
| 60.60.20.0/24 | 192.168.20.0/24 |
| ⋮ | ⋮ |
| Any | 192.168.0.0/24 |

FIG. 18

| DOMAIN NAME | IP ADDRESS |
|---|---|
| aaa.abc.co.jp | 192.168.70.2 |
| bbb.abc.co.jp | 192.168.70.3 |
| ⋮ | ⋮ |

NETWORK SYSTEM AND NETWORK SLICE GENERATION METHOD

CLAIM OF PRIORITY

The present application claims priority from Japanese patent application JP 2022-62874 filed on Apr. 5, 2022, the content of which is hereby incorporated by reference into this application.

BACKGROUND OF THE INVENTION

This invention relates to a setting system and a setting method for a network slice and an edge computer.

Use of wireless communication has been expanding. A 5th-generation (5G) communication scheme enables companies and municipalities to construct original wireless communication networks. Through construction of an original wireless communication network, a high-quality wireless communication network can be exclusively used without being affected by an external environment.

In addition, the 5G communication scheme enables one wireless communication network to be logically divided into a plurality of wireless communication networks having different communication qualities. For example, one wireless communication network can be logically divided into a communication network capable of high-speed and large-capacity communication, a communication network capable of low-latency communication, and a communication network capable of simultaneous coupling of a large number of apparatuses. Such logical division as described above prevents, for example, the communication requiring low latency from being affected by the high-speed and large-capacity communication. A standard for implementing this is defined as "network slicing."

In the 5G communication scheme, in order to enable the low-latency wireless communication, it is also possible to transfer a packet addressed to a specific destination to a computer placed at an edge. The computer placed at the edge is generally called "edge device" or "multi-access edge computing (MEC)," and a standard for transferring a packet to the MEC is defined as "traffic steering."

SUMMARY OF THE INVENTION

In regard to network slicing, concept thereof is being further defined, but how to logically divide a communication network through which a packet transmitted from a wireless communication apparatus is delivered to a destination, what kind of setting is performed for each apparatus to which the packet is transferred, and the like have not been standardized yet. Therefore, in order to actually construct network slices, it is required for an operator to perform design and setting work. In order to transfer a packet to an edge device, the operator is required to perform design and setting work therefor in the same manner.

In a 5G communication scheme, it is assumed that apparatuses are installed in companies and municipalities, and hence it is troublesome and costly for a provider of a wireless communication network to carry out those kinds of work.

When a technology as disclosed in JP 2019-41266 A is used, it is possible to select an optimum edge device and set a traffic steering function therefor in response to a request received from a user. It is also possible to select a different edge computer and change the setting of the traffic steering function therefor depending on a communication state.

However, in the setting of the traffic steering function for the edge device, it is required to consider setting details for apparatuses that implement each network slice. The same applies to the case of changing the setting of the traffic steering function depending on the communication state.

This invention has an object to simplify work required for an operator to perform design and setting for apparatuses that implement each network slice, and to set a traffic steering function for an edge device in consideration of setting details for the apparatuses that implement the network slice.

A representative example of the present invention disclosed in this specification is as follows: a network system comprises at least one communication facility, and at least one management apparatus. The at least one communication facility includes a wireless base station, at least one data processing apparatus configured to process data received through wireless communication, and a plurality of communication processing apparatuses configured to control communication. The at least one management apparatus manages resource management information for managing, as a resource, a value of an item to be set for the at least one communication facility in order to generate a network slice for each of characteristics of the network slice. The network slice is generated by logically dividing a network implemented by the at least one communication facility. The item includes identification information on the at least one data processing apparatus. The at least one management apparatus is configured to execute: first processing for generating, in a case where a network slice generation request including a characteristic of the network slice is received, the network slice by logically dividing the plurality of communication processing apparatuses; second processing for referring, based on the characteristic of the network slice included in the network slice generation request, to the resource management information to determine the value of the item and transmitting, to the at least one communication facility, first setting information for setting the determined value of the item; and third processing for associating identification information on a wireless terminal that communicates through the generated network slice and identification information on the at least one data processing apparatus in the network slice with each other, to thereby generate a transfer rule for transferring data transmitted from the wireless terminal to the at least one data processing apparatus, and transmitting, to the at least one communication facility, second setting information for setting the transfer rule.

According to the at least one embodiment of this invention, it is possible to suppress costs required for generating network slices, and it is possible to set the traffic steering function for the edge device in consideration of the setting details for the apparatuses that implement the network slice. Other problems, configurations, and effects than those described above will become apparent in the descriptions of embodiments below.

BRIEF DESCRIPTION OF THE DRAWINGS

The present invention can be appreciated by the description which follows in conjunction with the following figures, wherein:

FIG. 5 is a table for showing an example of a data structure of slice management information;

FIG. 6 is a table for showing an example of a data structure of transfer rule management information;

FIG. 7 is a table for showing an example of a data structure of domain name management information;

FIG. 8 is a table for showing an example of a data structure of communication state management information;

FIG. 9 is a table for showing an example of a data structure of communication quality condition management information;

FIG. 10 is a table for showing an example of a data structure of data processing apparatus management information;

FIG. 16 is a diagram for illustrating an example of a result of updating the slice management information;

FIG. 17 is a diagram for illustrating an example of a result of updating the transfer rule management information; and FIG. 18 is a diagram for illustrating an example of a result of updating the domain name management information.

DETAILED DESCRIPTION OF THE PREFERRED EMBODIMENTS

Figure 1:
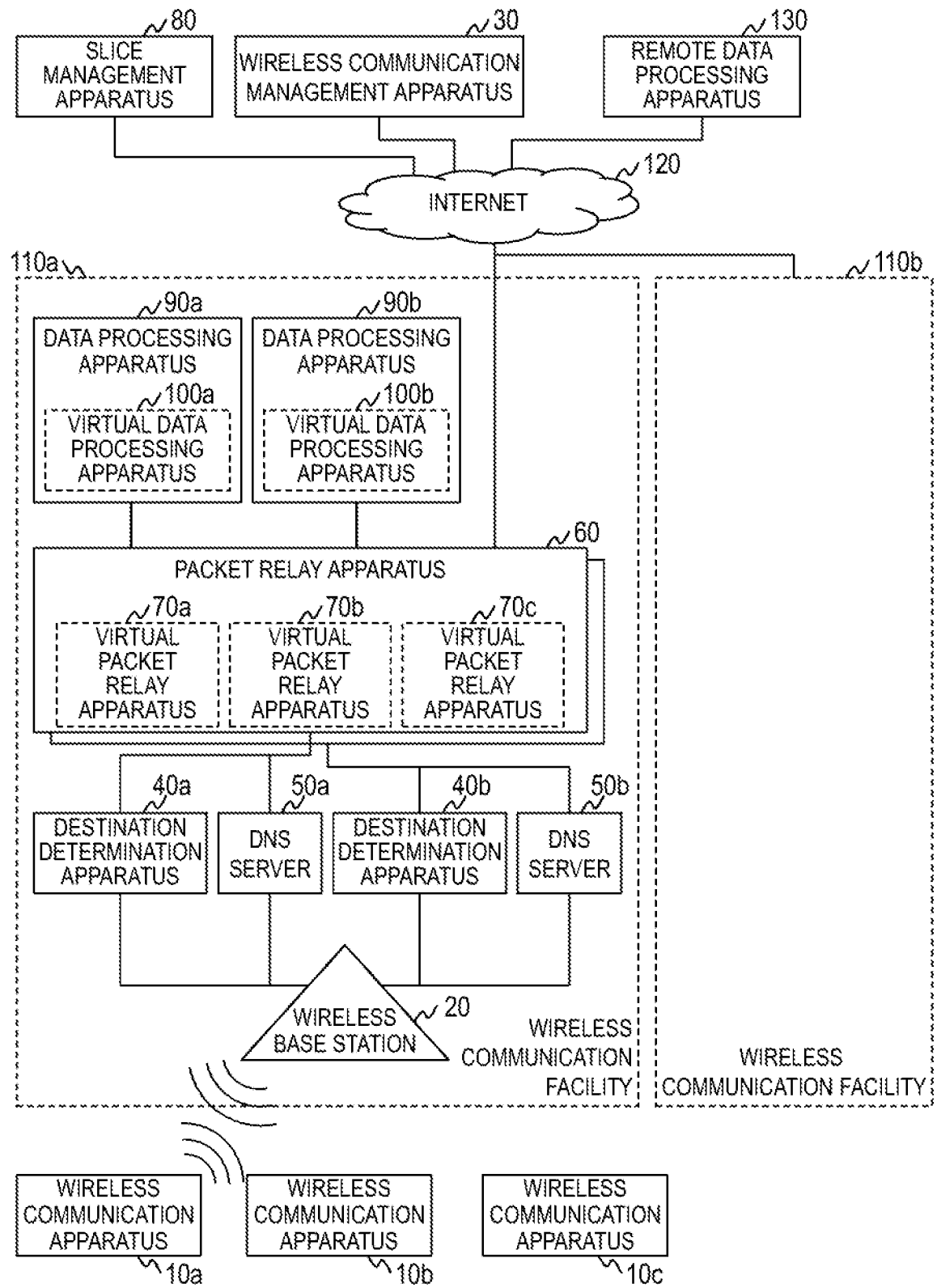
FIG. 1 is a block diagram for illustrating an example of a configuration of a network system according to a first embodiment.

Now, description is given of at least one embodiment of this invention referring to the drawings. It should be noted that this invention is not to be construed by limiting the invention to the content described in the following at least one embodiment. A person skilled in the art would easily recognize that specific configurations described in the following at least one embodiment may be changed within the scope of the concept and the gist of this invention.

In configurations of the at least one embodiment of this invention described below, the same or similar components or functions are denoted by the same reference numerals, and a redundant description thereof is omitted here.

Notations of, for example, "first", "second", and "third" herein are assigned to distinguish between components, and do not necessarily limit the number or order of those components.

First Embodiment (A1) System Configuration

FIG. 1 is a block diagram for illustrating an example of a configuration of a network system according to a first embodiment of this invention.

The network system includes a plurality of wireless communication apparatuses (wireless terminals) 10, a plurality of wireless communication facilities 110, a slice management apparatus 80, a wireless communication management apparatus 30, and a remote data processing apparatus 130. The wireless communication apparatuses 10 are each coupled to a wireless base station 20 through a wireless network. The wireless communication facilities 110 are each coupled to the slice management apparatus 80, the wireless communication management apparatus 30, and the remote data processing apparatus 130 through an Internet 120.

The wireless communication apparatuses 10 is an apparatus that performs wireless communication, and examples thereof include a robot, an automatic guided vehicle, and a sensor that operate in a factory, a tablet personal computer (PC), and a smartphone. The wireless communication apparatus 10 transmits and receives text, audio, video, and the like by wireless communication to/from the wireless communication facility 110. In FIG. 1, wireless communication apparatuses 10a, 10b, and 10c are provided, and the wireless communication apparatus 10a is wirelessly communicating to/from the wireless base station 20 of a wireless communication facility 110a.

The wireless communication facility 110 is a communication facility that implements a wireless communication network, and includes the wireless base station 20, a destination determination apparatus 40, a domain name system (DNS) server 50, a packet relay apparatus 60, and a data processing apparatus 90. In FIG. 1, the wireless communication facility 110a and a wireless communication facility 110b are provided. The destination determination apparatus 40, the DNS server 50, and the packet relay apparatus 60 are examples of communication processing apparatuses for controlling communication in the wireless network.

The wireless base station 20 performs wireless communication to/from the wireless communication apparatus 10. The wireless base station 20 is also coupled to the destination determination apparatus 40 in a wired manner, transmits data received from the wireless communication apparatus 10 to the destination determination apparatus 40, and receives data addressed to the wireless communication apparatus 10 and received from the destination determination apparatus 40.

The destination determination apparatus 40 is coupled to the wireless base station 20 and the packet relay apparatus 60 in a wired manner, transmits data received from the wireless base station 20 to the packet relay apparatus 60, and transmits data received from the packet relay apparatus 60 to the wireless base station 20. The destination determination apparatus 40 can refer to information on destinations and transmission sources included in the data to transmit data including information on a specific destination and transmission source to the data processing apparatus 90 included in the wireless communication facility 110.

The DNS server 50 manages correspondences between IP addresses and domain names of the data processing apparatus 90 and the remote data processing apparatus 130. In a case where the wireless communication apparatus 10 inquires about an IP address for a domain name, the DNS server 50 sends a response of the IP address corresponding to the domain name.

The packet relay apparatus 60 is coupled to the destination determination apparatus 40, the data processing apparatus 90, and the Internet 120 in a wired manner, transmits data received from the destination determination apparatus 40 to the data processing apparatus 90 or the Internet 120, and transmits data received from the data processing apparatus 90 or the Internet 120 to the destination determination apparatus 40. The packet relay apparatus 60 can be logically divided to separate a communication network. In FIG. 1, the packet relay apparatus 60 is divided into three, namely, a virtual packet relay apparatus 70a, a virtual packet relay apparatus 70b, and a virtual packet relay apparatus 70c. The virtual packet relay apparatus 70a, the virtual packet relay apparatus 70b, and the virtual packet relay apparatus 70c are communicating to/from the Internet 120, a data processing apparatus 90a, and a data processing apparatus 90b, respectively.

The data processing apparatus 90 is an apparatus that functions as an edge device, and executes predetermined processing on data received from the wireless communication apparatus 10. For example, the data processing apparatus 90 executes processing that requires immediate execution, such as real-time processing, on the received data, and transmits a result of the execution to the wireless communication apparatus 10. The data processing apparatus 90 can be logically divided. In FIG. 1, a virtual data processing apparatus 100a is present on the data processing apparatus 90a, and a virtual data processing apparatus 100b is present on the data processing apparatus 90b.

The slice management apparatus 80 sets a network slice, which is a virtual wireless network obtained by logically dividing the wireless network implemented by the wireless communication facility 110. Specifically, the slice management apparatus 80 performs setting for the destination determination apparatus 40, the packet relay apparatus 60, and the data processing apparatus 90 included in the wireless communication facility 110, and the wireless communication management apparatus 30. The slice management apparatus 80 further obtains information relating to communication states between the destination determination apparatus 40, the packet relay apparatus 60, and the data processing apparatus 90. The slice management apparatus 80 also obtains data from the wireless communication management apparatus 30. Detailed procedures for performing the setting for the apparatuses and for obtaining information on the communication states are described later.

The wireless communication management apparatus 30 manages a session of the wireless communication apparatus 10, and performs setting for the wireless base station 20 and the destination determination apparatus 40, which are included in the wireless communication facility 110.

The remote data processing apparatus 130 executes predetermined processing on data received from the wireless communication apparatus 10. For example, the remote data processing apparatus 130 executes processing allowed to take time, such as batch processing, and transmits a result of the execution to the wireless communication apparatus 10.

In regard to the wireless communication apparatus 10, the wireless base station 20, the destination determination apparatus 40, the DNS server 50, the packet relay apparatus 60, the virtual packet relay apparatus 70, the data processing apparatus 90, the virtual data processing apparatus 100, the slice management apparatus 80, and the wireless communication management apparatus 30, configurations thereof, kinds thereof, and the number thereof are not limited to the example illustrated in FIG. 1, and another mode may be employed as appropriate.

The slice management apparatus 80 may be included in the wireless communication facility 110. The wireless communication management apparatus 30 may have the function of the slice management apparatus 80, or the slice management apparatus 80 may have the function of the wireless communication management apparatus 30.

(A2) Configuration of Slice Management Device

Figure 2:
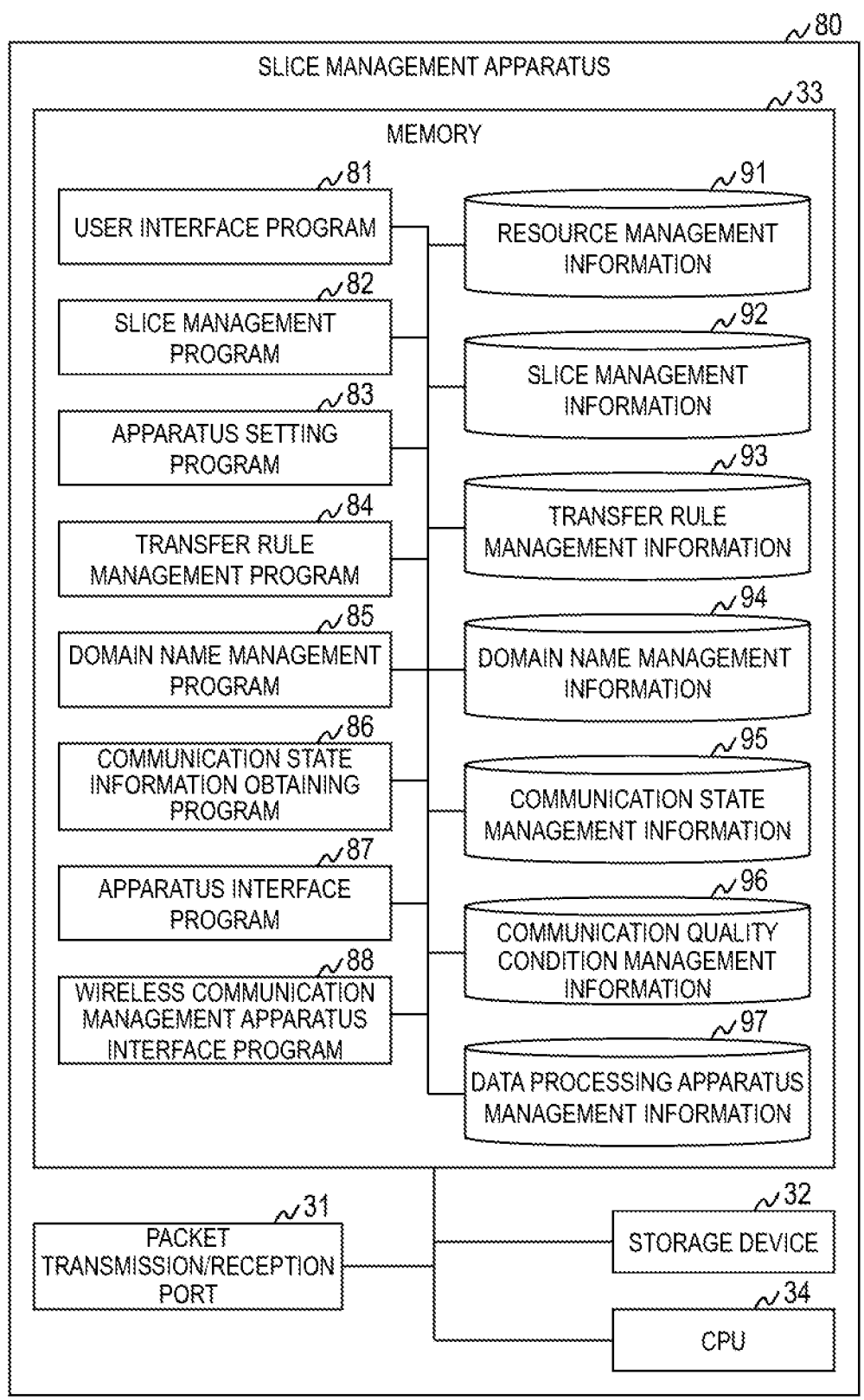
FIG. 2 is a block diagram for illustrating an example of the configuration of a slice management apparatus in the first embodiment.

FIG. 2 is a block diagram for illustrating an example of the configuration of the slice management apparatus 80 in the first embodiment.

The slice management apparatus 80 includes a packet transmission/reception port 31, a storage device 32, a memory 33, and a central processing unit (CPU) 34.

The storage device 32 is a storage device formed of a non-volatile storage element, such as a hard disk drive, a solid state disk, and a flash memory. The storage device 32 stores some or all of programs to be executed by the CPU 34, and also stores some or all of pieces of information to be used by the programs.

Some or all of the programs and the pieces of information may be stored in the storage device 32 in advance, or may be loaded from a non-temporary storage medium or from an external information processing apparatus provided with a non-temporary storage device through a network.

The CPU 34 executes each of programs stored in the memory 33. The CPU 34 executes processing in accordance with each program, to thereby operate as a functional module that implements a specific function. In the following description, when processing is described with a program as the subject of a sentence, the sentence indicates that the CPU 34 executes that program. The slice management apparatus 80 may include a plurality of CPUs 34.

The memory 33 stores programs that implement respective functions of the slice management apparatus 80. The memory 33 is also used as a work area for the programs to temporarily read and write data. In a case where a program is stored in the storage device 32, the CPU 34 reads out the program from the storage device 32 and loads the program onto the memory 33.

The memory 33 in the first embodiment stores a user interface program 81, a slice management program 82, an apparatus setting program 83, a transfer rule management program 84, a domain name management program 85, a communication state information obtaining program 86, an apparatus interface program 87, and a wireless communication management apparatus interface program 88. The memory 33 also stores resource management information 91, slice management information 92, transfer rule management information 93, domain name management information 94, communication state management information 95, communication quality condition management information 96, and data processing apparatus management information 97. The memory 33 includes a program such as an operating system (OS), which is omitted herein.

(A3) Configuration of Wireless Communication Management Device

Figures 3, 4:
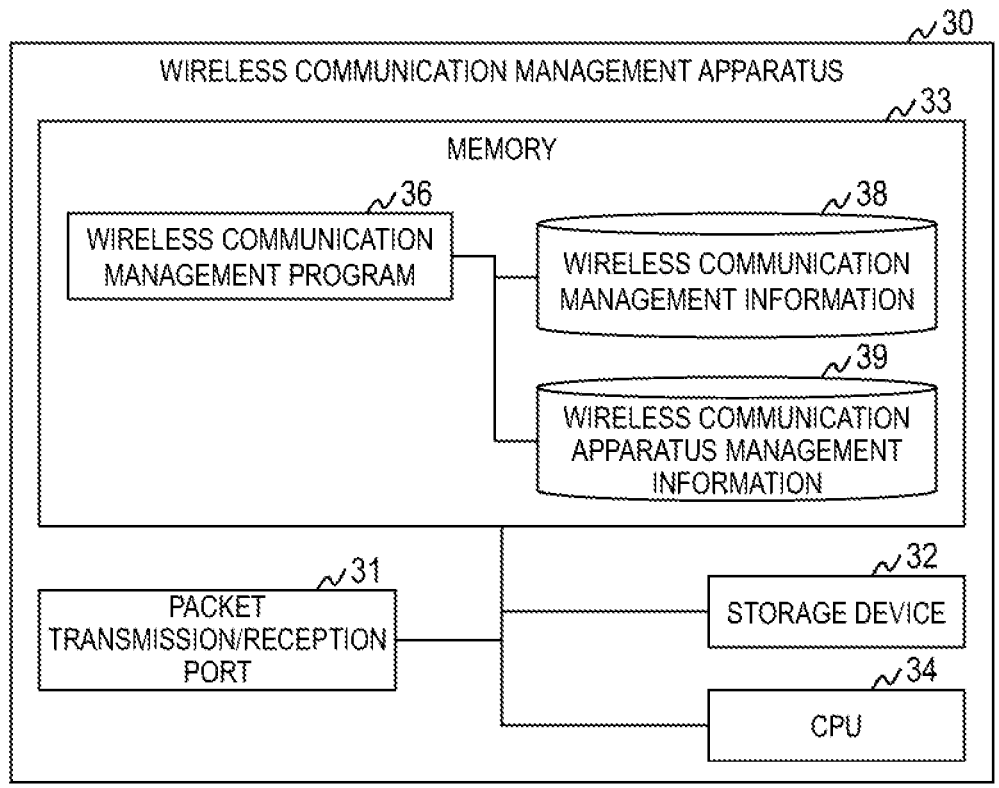
FIG. 3 is a block diagram for illustrating an example of the configuration of a wireless communication management apparatus in the first embodiment.
FIG. 4 is a table for showing an example of a data structure of resource management information.

FIG. 3 is a block diagram for illustrating an example of the configuration of the wireless communication management apparatus 30 in the first embodiment.

The wireless communication management apparatus 30 includes the packet transmission/reception port 31, the storage device 32, the memory 33, and the CPU 34.

In the same manner as in the slice management apparatus 80, the CPU 34 executes each of programs stored in the storage device 32 and/or the memory 33. Some or all of those programs and pieces of information to be used by the programs may be loaded from the outside in the same manner as in the slice management apparatus 80.

The memory 33 in the first embodiment stores a wireless communication management program 36. The wireless communication management program 36 assigns an address to the wireless communication apparatus 10 and manages a session. The memory 33 also stores wireless communication management information 38 and wireless communication apparatus management information 39.

(A4) Data Structures of Information

FIG. 4 is a table for showing an example of a data structure of the resource management information 91.

The resource management information 91 is information for managing, as resources, values of items to be set for communication processing apparatuses that implement each network slice. The resource management information 91 stores an entry including a resource name 911, a start 912, an end 913, and an increment 914. There is one entry for one item. Fields included in the entry are not limited to those described above. The entry may not include any one of the fields described above, or may include another field.

The resource name 911 is a field for storing a name indicating a type of a resource. The start 912 and the end 913 are fields for storing values for identifying a range of the resource. The increment 914 is a field for storing the number of allocated resources.

For example, an entry having the resource name 911 being "VLAN" indicates that a range of from "10" to "250" is managed as a pool of pieces of identification information (items) of the VLAN.

FIG. 5 is a table for showing an example of a data structure of the slice management information 92.

The slice management information 92 is information for managing network slices generated on the wireless communication facility 110. The slice management information 92 stores an entry including a type 921, a data network 922, a VLAN ID 923, a subnet 924, an apparatus name 925, and an IP address 926. There is one entry for one network slice. Fields included in the entry are not limited to those described above. The entry may not include any one of the fields described above, or may include another field.

The type 921 is a field for storing a value indicating a type of a network slice. Examples of the type of the network slice include a network slice supporting low-latency communication, a network slice supporting large-capacity communication, and a network slice supporting simultaneous coupling of a large number of wireless communication apparatuses 10.

The data network 922 is a field for storing identification information on a data network on the network slice. The VLAN ID 923 is a field for storing identification information on a VLAN allocated to the network slice. The subnet 924 is a field for storing a subnet allocated to the network slice.

The apparatus name 925 and the IP address 926 are fields for storing the name and IP address of each of apparatuses that form the network slice and managed by the slice management apparatus 80. In the first embodiment, one entry includes rows of the destination determination apparatus 40 and the virtual data processing apparatus 100.

FIG. 6 is a table for showing an example of a data structure of the transfer rule management information 93.

The transfer rule management information 93 is information for managing a transfer rule for data addressed to a network slice. The transfer rule management information 93 includes a transmission source 931 and a destination 932. There is one entry for one transfer rule. Fields included in the entry are not limited to those described above. The entry may not include any one of the fields described above, or may include another field.

The transmission source 931 is a field for storing a subnet for a user, which is a transmission source. The destination 932 is a field for storing a subnet allocated to the network slice at the destination. Data including the IP address set in the transmission source 931 is transferred to the network slice to which the subnet of the destination 932 is allocated.

For example, the first entry indicates that data having a transmission source of "60.60.10.0/24" is to be transferred to a subnet at "192.168.10.0/24". As shown in FIG. 5, the data transferred to the network slice to which the subnet at "192.168.10.0/24" is allocated is to be transmitted to the virtual data processing apparatus 100a having an IP address of "192.168.10.2" through a network having a VLAN ID of "10". An entry having the transmission source 931 being "Any" is a transfer rule for data to which no other transfer rules are applicable.

FIG. 7 is a table for showing an example of a data structure of the domain name management information 94.

The domain name management information 94 is information for managing correspondence relationships between domain names and IP addresses to be used by the DNS server 50 for name resolution. The domain name management information 94 stores an entry including a domain name 941 and an IP address 942. There is one entry for one correspondence relationship. Fields included in the entry are not limited to those described above. The entry may not include any one of the fields described above, or may include another field.

The domain name 941 is a field for storing a domain name of an edge device. The IP address 942 is a field for storing an IP address corresponding to the domain name.

FIG. 8 is a table for showing an example of a data structure of the communication state management information 95.

The communication state management information 95 is information for managing a communication quality of each of the data processing apparatuses 90 that form a network slice. The communication state management information 95 stores an entry including a data processing apparatus ID 951 and a communication quality 952. There is one entry for one of the data processing apparatuses 90 that form the network slice. Fields included in the entry are not limited to those described above. The entry may not include any one of the fields described above, or may include another field.

The data processing apparatus ID 951 is a field for storing an IP address assigned to one of the data processing apparatuses 90 that form a network slice. The communication quality 952 is a group of fields for storing values indicating the communication quality of the data processing apparatus 90. The communication quality 952 stores values, such as latency and a communication speed.

FIG. 9 is a table for showing an example of a data structure of the communication quality condition management information 96.

The communication quality condition management information 96 is information for managing a condition for the communication quality to be satisfied for each of characteristics of the network slices. In a 5G communication scheme, target values of the communication quality are defined for each of the characteristics of the network slices in 3GPP TR 38.913 V16.0.0: "Study on Scenarios and Requirements for Next Generation Access Technologies," July 2020. For example, for a network slice supporting low-latency communication, the target value of a one-way wireless transmission latency is defined as "0.5 millisecond (ms)." For a network slice supporting large-capacity communication, the target values of a downlink peak communication speed and an uplink peak communication speed are defined as "20 gigabits per second (Gbps)" and "10 gigabits per second (Gbps)," respectively.

The communication quality condition management information 96 stores an entry including a type 961 and a quality condition 962. There is one entry for one of the characteristics of the network slices. Fields included in the entry are not limited to those described above. The entry may not include any one of the fields described above, or may include another field.

The type 961 is a field for storing a value indicating a type of a network slice. The quality condition 962 is a group of fields for storing quality conditions set for the type of the network slice. The quality condition 962 includes fields for storing threshold values (allowable values) for respective items of the communication quality.

For example, an entry having the type 961 being "LARGE CAPACITY" indicates that the network slice supporting the large-capacity communication has an upper limit value of the latency being "100 milliseconds (ms)" and a lower limit value of the allowable communication speed being "200 megabytes (MB)."

The quality condition is not set for each individual data processing apparatus 90, but is set for the network slice. This indicates that in a case where at least one of the data processing apparatuses 90 that form the network slice does not satisfy the quality condition, the network slice itself does not satisfy the quality condition.

FIG. 10 is a table for showing an example of a data structure of the data processing apparatus management information 97.

The data processing apparatus management information 97 is information for managing the data processing apparatus 90. The data processing apparatus management information 97 stores an entry including a data processing apparatus ID 971 and a virtual data processing apparatus ID 972. There is one entry for one combination of the data processing apparatus 90 and the virtual data processing apparatus 100. Fields included in the entry are not limited to those described above. The entry may not include any one of the fields described above, or may include another field.

The data processing apparatus ID 971 is a field for storing an IP address assigned to the data processing apparatus 90. The virtual data processing apparatus ID 972 is a field for storing an IP address assigned to the virtual data processing apparatus 100. In a case where the data processing apparatus 90 is not logically divided, the virtual data processing apparatus ID 972 is left blank.

For example, the first entry indicates that the virtual data processing apparatus 100 to which the IP address of "192.168.10.2" is assigned is present on the data processing apparatus 90 to which an IP address of "192.168.0.251" is assigned. The second entry indicates that the virtual data processing apparatus 100 is not present on the data processing apparatus 90 to which an IP address of "192.168.0.252" is assigned.

Figure 11:
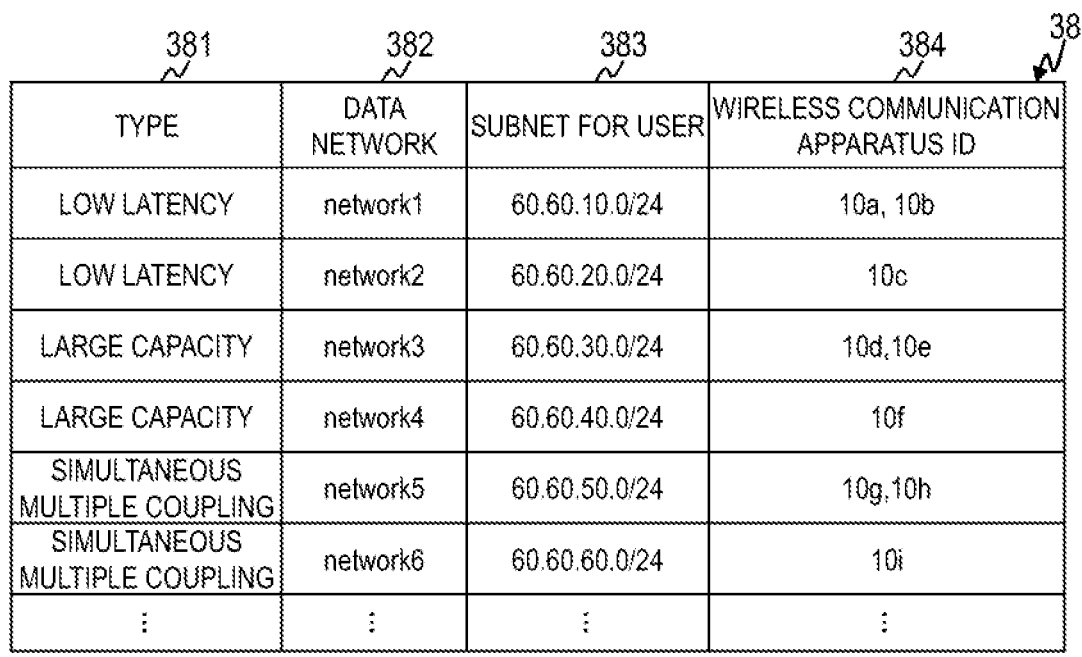
FIG. 11 is a table for showing an example of a data structure of wireless communication management information.

FIG. 11 is a table for showing an example of a data structure of the wireless communication management information 38.

The wireless communication management information 38 is information for managing a subnet used by the wireless communication apparatus 10 in the network slice. The wireless communication management information 38 stores an entry including a type 381, a data network 382, a subnet 383 for user, and a wireless communication apparatus ID 384. There is one entry for one network slice. Fields included in the entry are not limited to those described above. The entry may not include any one of the fields described above, or may include another field.

The type 381 is a field for storing a value indicating a type of a network slice. The data network 382 is a field for storing identification information on a data network on the network slice. The subnet 383 for user is a field for storing a sub-network used by the wireless communication apparatus 10. The wireless communication apparatus ID 384 is a field for storing identification information on the wireless communication apparatus 10 that communicates through the sub-network.

The first entry indicates that a data network having identification information of "network1" has been defined on the network slice having a type of "LOW LATENCY" and that "60.60.10.0/24" is assigned as the subnet of the wireless communication apparatus 10 that uses that data network. The first entry also indicates that the wireless communication apparatuses 10a and 10b are registered as the wireless communication apparatuses 10 that use the data network.

(A5) Setting Operation Sequence in Response to Setting Request made by Operator

Figure 12:
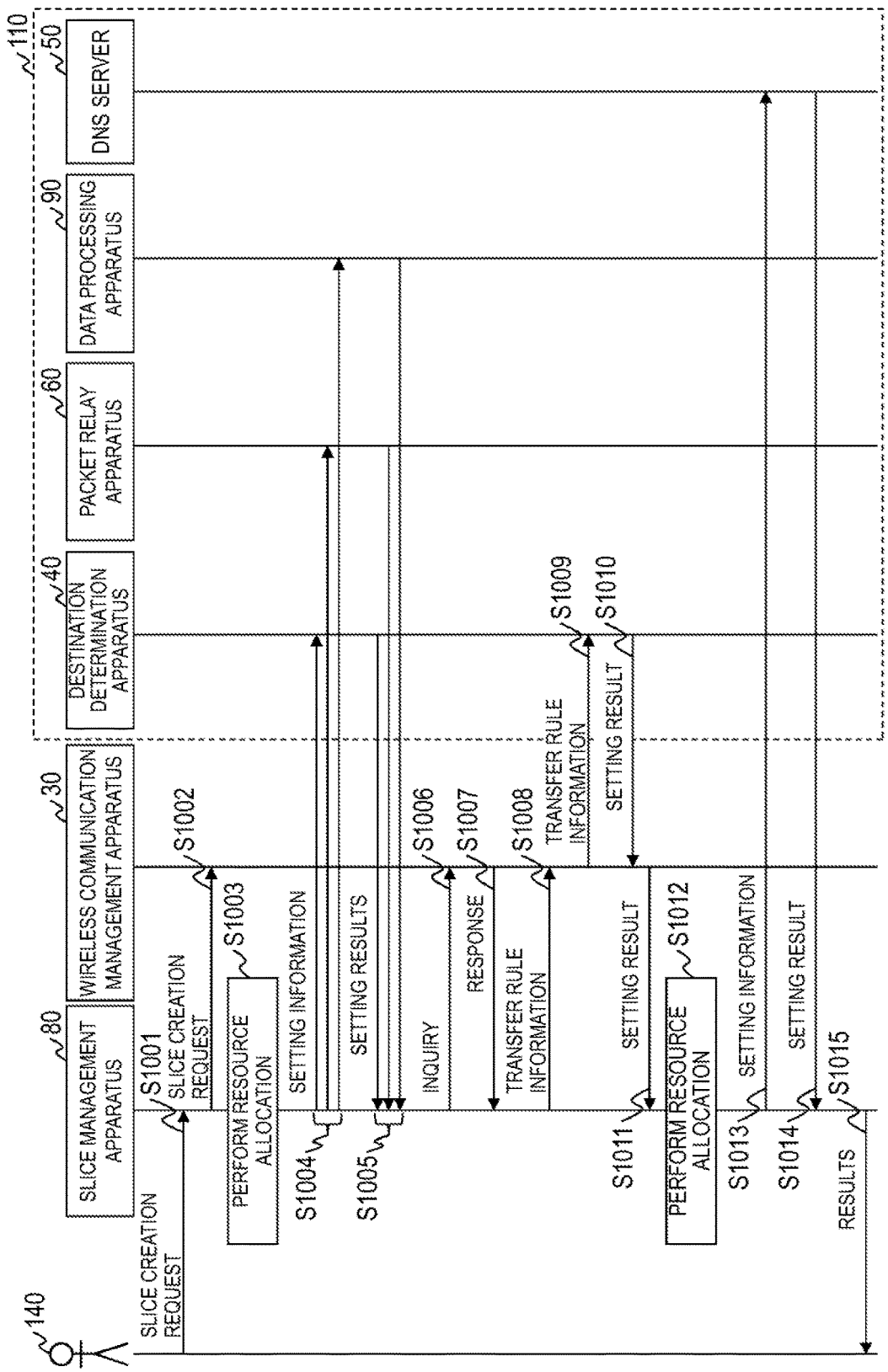
FIG. 12 is a sequence diagram for illustrating an example of network slice setting processing for the network system according to the first embodiment.
Figure 13:
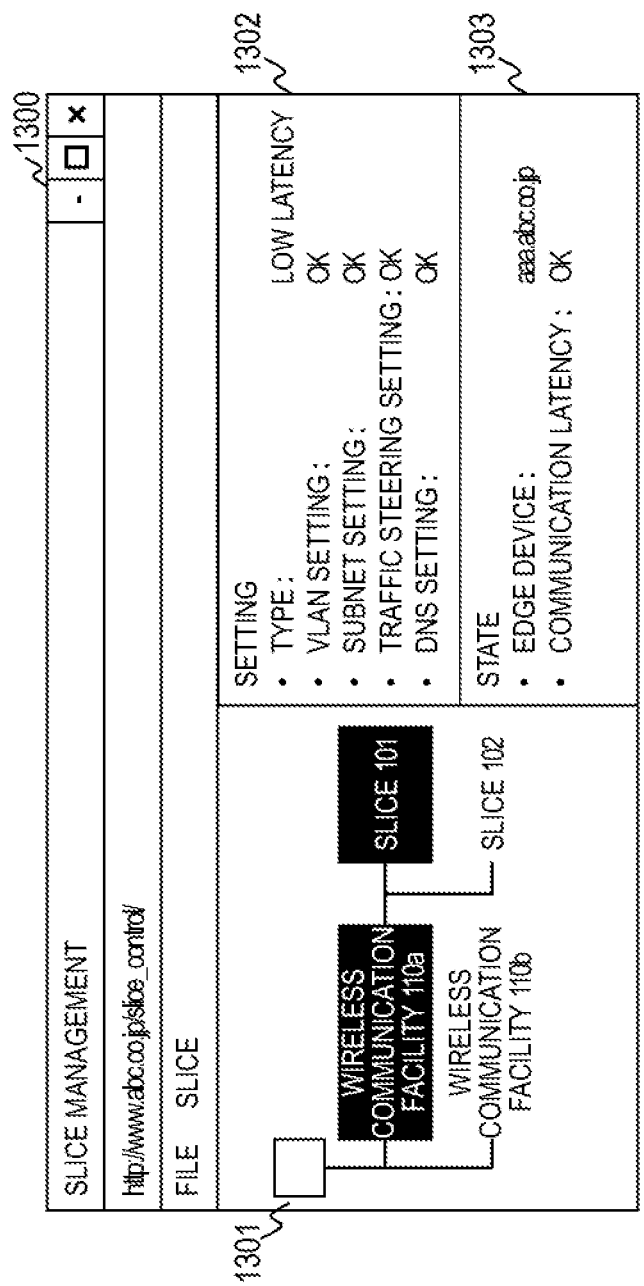
FIG. 13 is a diagram for illustrating an example of a screen presented by the slice management apparatus in the first embodiment.

FIG. 12 is a sequence diagram for illustrating an example of network slice setting processing for the network system according to the first embodiment. FIG. 13 is a diagram for illustrating an example of a screen presented by the slice management apparatus 80 in the first embodiment.

An operator 140 of a wireless communication network issues a slice creation request to the slice management apparatus 80 (Step S1001). The slice creation request includes a type of a slice and identification information on a data network.

In a case where the user interface program 81 of the slice management apparatus 80 receives the slice creation request, the user interface program 81 calls the slice management program 82. The slice management program 82 transmits the slice creation request to the wireless communication management apparatus 30 (Step S1002).

In a case where the wireless communication management program 36 of the wireless communication management apparatus 30 receives the slice creation request, the wireless communication management program 36 generates network slices by logically dividing the communication processing apparatuses of the wireless communication facility 110. A network slice generation method is a publicly known technology, and hence a detailed description thereof is omitted. At this time, the subnet for the user is set as well. In a case where the network slice generation is completed, the wireless communication management program 36 transmits a response to the slice management apparatus 80.

In a case where the slice management program 82 receives the response, the slice management program 82 performs resource allocation (Step S1003). In this case, the VLAN ID, the IP address, and the subnet are items to be allocated.

Specifically, the slice management program 82 refers to the slice management information 92 to identify resources allocated to a network slice of the designated type. In a case where no resource is allocated, that is, in a case where there is no network slice of the designated type, the slice management program 82 issues a value set in the start 912 of each entry of the resource management information 91. In a case where resources are allocated, the slice management program 82 identifies a maximum value of the resource allocated to each item, and adds a value in the increment 914 to the maximum value. In a case where the obtained value is equal to or smaller than a value in the end 913, the slice management program 82 issues the obtained value. In a case where the value is larger than the value in the end 913, the slice management program 82 refers to the slice management information 92 to identify an unused value and issue the identified value.

At this time, the slice management program 82 determines the data processing apparatus 90 to be used, and generates information for generating the virtual data processing apparatus 100 in the data processing apparatus 90.

The apparatus setting program 83 of the slice management apparatus 80 transmits setting information for setting the issued values of the items to the destination determination apparatus 40, the packet relay apparatus 60, and the data processing apparatus 90 through intermediation of the apparatus interface program 87 (Step S1004).

After the setting is completed, the destination determination apparatus 40, the packet relay apparatus 60, and the data processing apparatus 90 transmit results of the setting to the slice management apparatus 80 (Step S1005). In a case where the apparatus setting program 83 of the slice management apparatus 80 receives the setting results indicating that the setting is successful, the apparatus setting program 83 registers the set details in the slice management information 92.

Subsequently, the transfer rule management program 84 of the slice management apparatus 80 inquires the wireless communication management apparatus 30 about the subnet for the user who uses a network slice (Step S1006). The query includes the type of the network slice and the identification information on the data network.

In a case where the wireless communication management program 36 of the wireless communication management apparatus 30 receives the inquiry from the slice management apparatus 80, the wireless communication management program 36 transmits a response including the subnet for the user to the slice management apparatus 80 (Step S1007).

Specifically, the wireless communication management program 36 refers to the wireless communication management information 38 to retrieve an entry in which a combination of the values of the type 381 and the data network 382 matches a combination of the type of the network slice and the identification information on the data network included in the query. The wireless communication management program 36 obtains the subnet for the user from the subnet 383 for user of the retrieved entry, and transmits a response including the obtained subnet for the user. For example, in a case where the type of the network slice is "LOW LATENCY" and the identification information on the data network is "network1", a subnet for the user of "60.60.10.0/24" is included in the response.

In a case where the transfer rule management program 84 of the slice management apparatus 80 receives the response from the wireless communication management apparatus 30, the transfer rule management program 84 generates transfer rule information in which the subnet for the user included in the response and the subnet allocated to the network slice are associated with each other, and transmits the transfer rule information to the wireless communication management apparatus 30 (Step S1008).

In a case where the wireless communication management apparatus 30 receives the transfer rule information, the wireless communication management apparatus 30 transmits the transfer rule information to the destination determination apparatus 40 (Step S1009).

After the setting is completed, the destination determination apparatus 40 transmits a result of the setting to the wireless communication management apparatus 30 (Step S1010). In a case where the wireless communication management apparatus 30 receives the setting result from the destination determination apparatus 40, the wireless communication management apparatus 30 transmits the setting result to the slice management apparatus 80 (Step S1011).

In a case where the slice management apparatus 80 receives the setting result indicating that the setting is successful from the wireless communication management apparatus 30, the slice management apparatus 80 registers the transfer rule in the transfer rule management information 93.

Subsequently, the slice management program 82 of the slice management apparatus 80 issues a domain name to be assigned to the virtual data processing apparatus 100 (Step S1012).

The domain name management program 85 generates setting information in which the IP address and the domain name of the virtual data processing apparatus 100 are associated with each other, and transmits the setting information to the DNS server 50 (Step S1013). After the setting is completed, the DNS server 50 transmits a result of the setting to the slice management apparatus 80 (Step S1014).

In a case where the domain name management program 85 of the slice management apparatus 80 receives the setting result indicating that the setting is successful, the domain name management program 85 registers the setting information in the domain name management information 94.

The user interface program 81 of the slice management apparatus 80 transmits the results of the series of processing steps to the operator 140 (Step S1015).

For example, a screen 1300 as illustrated in FIG. 13 is displayed. The screen 1300 includes a network slice display field 1301, a setting display field 1302, and a state display field 1303.

The network slice display field 1301 is a field for displaying network slices. The setting display field 1302 is a field for displaying a setting state of a network slice. The state display field 1303 is a field for displaying the communication state of the data processing apparatus 90 or the virtual data processing apparatus 100 included in the network slice.

FIG. 13 indicates that a network slice of "SLICE 101" having the type of "LOW LATENCY" is set in the wireless communication facility 110*a* and that the setting of all the items is successful. It is also indicated that a domain name of "aaa.abc.co.jp" is assigned to the edge device of the network slice and that no communication latency has occurred.

In a case where the wireless communication apparatus 10 transmits data to the edge device at "aaa.abc.co.jp", the DNS server 50 identifies the destination IP address of "192.168.10.2" from the domain name, and sets "192.168.10.2" as the destination of the data. The data is transferred to the edge device through the data network having the VLAN ID of "10" allocated to the network slice by a traffic steering function of the destination determination apparatus 40.

It should be noted that an execution order of processing steps may be changed as long as the processing remains consistent.

According to the first embodiment, when the operator designates a type of a network slice, the setting for apparatuses that implement each network slice is automatically completed. In addition, the transfer rule with respect to the edge device is automatically set in accordance with the network slice setting.

Second Embodiment

In a second embodiment of this invention, processing executed in a case where the communication state of a network slice does not satisfy the quality condition is described. The second embodiment is described below with a focus on differences from the first embodiment.

A configuration of a network system according to the second embodiment is the same as that in the first embodiment. The configurations of the slice management apparatus 80 and the wireless communication management apparatus 30 in the second embodiment are the same as those in the first embodiment.

(B1) Setting Operation Sequence in Response to Change of Communication Quality

Figure 14:
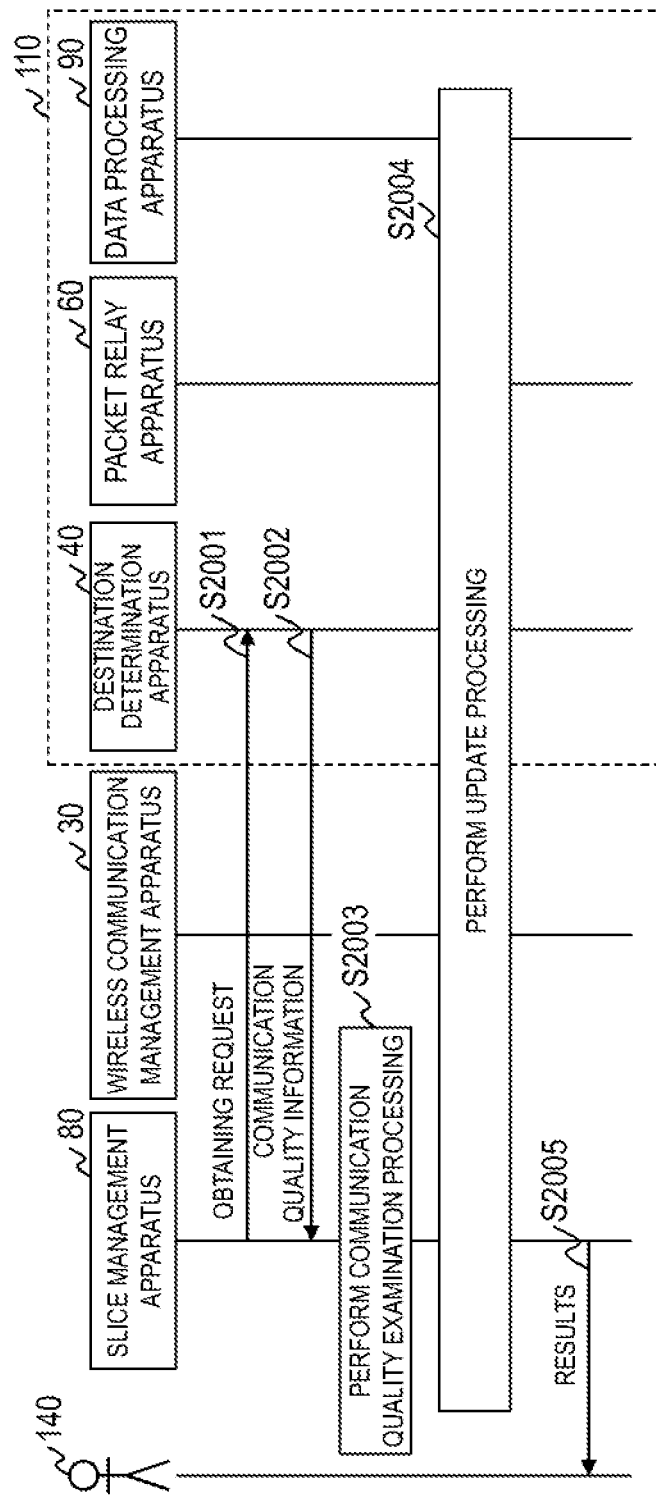
FIG. 14 is a sequence diagram for illustrating an example of network slice setting changing processing for the network system according to a second embodiment.
Figure 15:
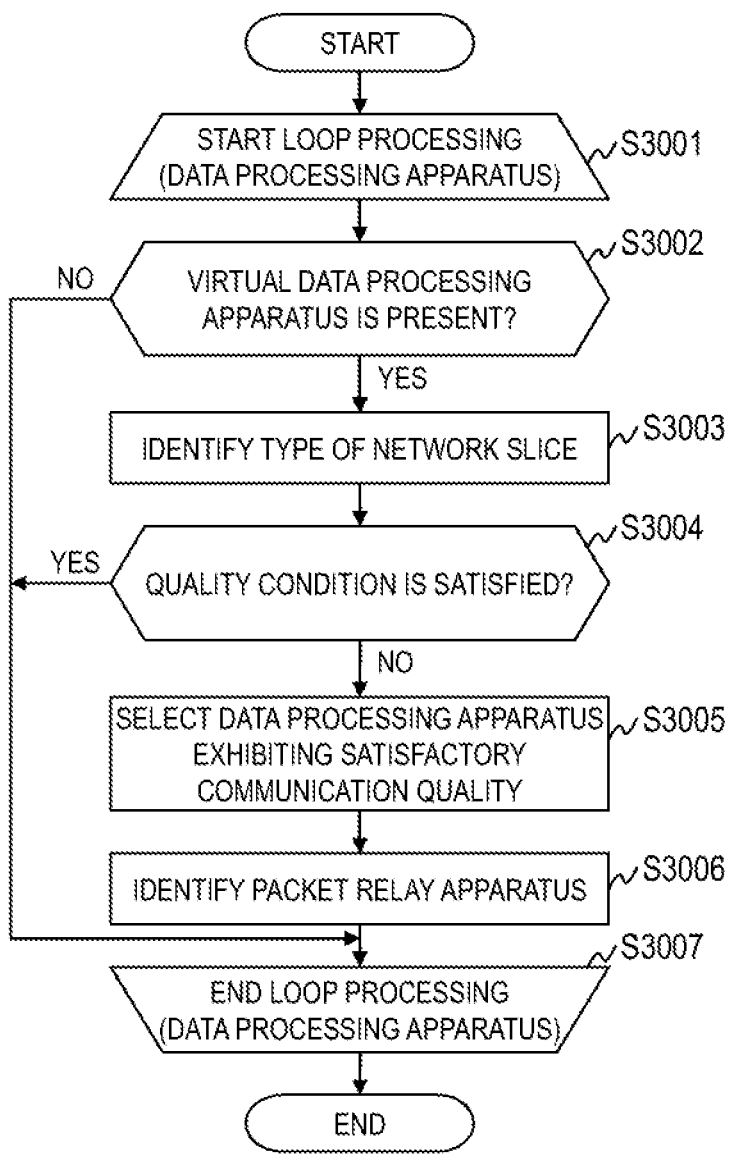
FIG. 15 is a diagram for illustrating an example of communication quality examination processing executed by the slice management apparatus in the second embodiment.

FIG. 14 is a sequence diagram for illustrating an example of network slice setting changing processing for the network system according to the second embodiment. FIG. 15 is a diagram for illustrating an example of communication quality examination processing executed by the slice management apparatus 80 in the second embodiment. FIG. 16 is a diagram for illustrating an example of a result of updating the slice management information 92. FIG. 17 is a diagram for illustrating an example of a result of updating the transfer rule management information 93. FIG. 18 is a diagram for illustrating an example of a result of updating the domain name management information 94.

After the network slice setting processing described in the first embodiment has been executed, the communication state information obtaining program 86 of the slice management apparatus 80 periodically transmits an obtaining request to the destination determination apparatus 40 in order to obtain information relating to a communication quality between the destination determination apparatus 40 and the data processing apparatus 90 (Step S2001). Any cycle period can be set therefor.

The destination determination apparatus 40 measures the quality of communication to/from the data processing apparatus 90, and transmits communication quality information including a result of the measurement to the slice management apparatus 80 (Step S2002). In a case where the slice management apparatus 80 receives the communication quality information, the slice management apparatus 80 registers the communication quality information in the communication state management information 95.

The communication state information obtaining program 86 of the slice management apparatus 80 executes the communication quality examination processing (Step S2003). Now, the communication quality examination processing is described with reference to FIG. 15.

The communication state information obtaining program 86 starts loop processing for each of the data processing apparatuses 90 (Step S3001). First, the communication state information obtaining program 86 selects one entry from the communication state management information 95.

The communication state information obtaining program 86 refers to the data processing apparatus management information 97 to determine whether or not the virtual data processing apparatus 100 is present on the selected data processing apparatus 90 (Step S3002).

In a case where the virtual data processing apparatus 100 is not present on the selected data processing apparatus 90, the communication state information obtaining program 86 advances the process to Step S3007.

In a case where the virtual data processing apparatus 100 is present on the selected data processing apparatus 90, the communication state information obtaining program 86 refers to the slice management information 92 to identify a network slice to which a data network including, in a configuration thereof, the virtual data processing apparatus 100 on the selected data processing apparatus 90 belongs, and further identify the type of the network slice (Step S3003).

The communication state information obtaining program 86 determines whether or not the quality condition for the identified type of the network slice is satisfied (Step S3004).

Specifically, the communication state information obtaining program 86 compares the communication quality 952 of the entry selected from the communication state management information 95 and the quality condition 962 of the entry of the communication quality condition management information 96 corresponding to the identified type to each other. For example, it is determined whether or not the value of the latency included in the communication quality 952 is smaller than the value (threshold value) of the latency included in the quality condition 962. In a case where the required quality is not satisfied for at least one item, it is determined that the quality condition for the type of the network slice is not satisfied.

In a case where the quality condition for the identified type of the network slice is satisfied, the communication state information obtaining program 86 advances the process to Step S3007.

In a case where the quality condition for the identified type of the network slice is not satisfied, the communication state information obtaining program 86 refers to the communication state management information 95 to select the data processing apparatus 90 that satisfies the communication quality (Step S3005). In a case where there are a plurality of data processing apparatuses 90 that satisfy the communication quality, the data processing apparatus 90 having the best communication quality is selected.

The communication state information obtaining program 86 identifies the packet relay apparatus 60 coupled to the identified data processing apparatus 90 (Step S3006), and then advances the process to Step S3007.

In Step S3007, the communication state information obtaining program 86 determines whether or not the process for all the data processing apparatuses 90 has been completed (Step S3007).

In a case where the processing for all the data processing apparatuses 90 has not been completed, the communication state information obtaining program 86 returns the process to Step S3001 to select a new one of the data processing apparatuses 90.

In a case where the processing for all the data processing apparatuses 90 has been completed, the communication state information obtaining program 86 ends the communication quality examination processing.

The communication quality examination processing has been described above. Referring back to FIG. 14, in a case where a new one of the data processing apparatuses 90 is selected in the communication quality examination processing, the following processing is executed.

The communication state information obtaining program 86 calls the slice management program 82. The slice management program 82 executes update processing (Step S2004), and the user interface program 81 transmits the results of the series of processing steps to the operator 140 (Step S2005). In the update processing, the processing steps of from Step S1003 to Step S1005 and from Step S1008 to Step S1014 are executed. However, some of the processing steps are different.

In Step S1003, the slice management program 82 issues a new VLAN ID, subnet, and IP address. A resource allocation method is the same as that used in the first embodiment, and hence a detailed description thereof is omitted.

In Step S1004, the apparatus setting program 83 transmits the setting information for setting the newly issued values of the items to the destination determination apparatus 40, the packet relay apparatus 60, and the data processing apparatus 90 through intermediation of the apparatus interface program 87. In a case where the apparatus setting program 83 of the slice management apparatus 80 receives the setting results indicating that the setting is successful, the apparatus setting program 83 updates the slice management information 92 based on the set details. For example, the slice management information 92 is updated as shown in FIG. 16.

In FIG. 16, the VLAN ID, subnet, and IP address of the edge device of the data network of "network1" have been updated. Further, the apparatus setting program 83 outputs the subnet before the update and the subnet after the update to the transfer rule management program 84, and outputs the IP address before the update and the IP address after the update to the domain name management program 85.

In Step S1008, the transfer rule management program 84 retrieves an entry in which the subnet before the update is set in the destination 932 to generate transfer rule information in which the subnet for the user in the transmission source 931 of the retrieved entry and the subnet after the update are associated with each other, and transmits the transfer rule information to the wireless communication management apparatus 30. In a case where the slice management apparatus 80 receives the setting result indicating that the setting is successful from the wireless communication management apparatus 30, the slice management apparatus 80 updates the destination 932 of the retrieved entry. The transfer rule management information 93 is updated as shown in, for example, FIG. 17.

In FIG. 17, the destination of data corresponding to the transmission source 931 being "60.60.10.0/24" has been updated from "192.168.10.0/24" to "192.168.70.0/24". As shown in FIG. 16, data to be transferred to a network slice to which a subnet at "192.168.70.0/24" is allocated is transmitted to the virtual data processing apparatus 100a having an IP address of "192.168.70.2" through a network having a VLAN ID of "70".

In Step S1013, the domain name management program 85 retrieves an entry in which the IP address before the update is set in the IP address 942 to generate setting information in which the domain name in the domain name 941 of the retrieved entry and the IP address after the update are associated with each other, and transmits the setting information to the DNS server 50. In a case where the slice management apparatus 80 receives the setting result indicating that the setting is successful, the slice management apparatus 80 registers the IP address 942 of the retrieved entry. The domain name management information 94 is updated as shown in, for example, FIG. 18.

In FIG. 18, the IP address corresponding to the domain name 941 being "aaa.abc.co.jp" has been updated from "192.168.10.2" to "192.168.70.2". In a case where the wireless communication apparatus 10 transmits data to the edge device at "aaa.abc.co.jp", the DNS server 50 identifies the destination IP address of "192.168.70.2" from the domain name, and sets "192.168.70.2" as the destination of the data. The data is transferred to the edge device through the data network having the VLAN ID "70" allocated to the network slice by the traffic steering function of the destination determination apparatus 40.

According to the second embodiment, the network slice setting can be automatically updated based on the communication quality.

In addition to the configuration including the slice management apparatus 80, this invention and/or the at least one embodiment may be configured as a setting method or a computer program to be executed by the slice management apparatus 80 as well. The computer program may be recorded on a computer-readable recording medium. As the recording medium, it is possible to use various media, for example, a floppy disk, a CD-ROM, a DVD-ROM, a magneto-optical disk, a memory card, and a hard disk drive.

The present invention is not limited to the above embodiment and includes various modification examples. In addition, for example, the configurations of the above embodiment are described in detail so as to describe the present invention comprehensibly. The present invention is not necessarily limited to the embodiment that is provided with all of the configurations described. In addition, a part of each configuration of the embodiment may be removed, substituted, or added to other configurations.

A part or the entirety of each of the above configurations, functions, processing units, processing means, and the like may be realized by hardware, such as by designing integrated circuits therefor. In addition, the present invention can be realized by program codes of software that realizes the functions of the embodiment.

Information such as programs, tables, and files that implement each function can be stored in a storage device such as a memory, a hard disk, a solid state drive (SSD), or a storage medium such as an IC card, a SD card, and a DVD.

In the above embodiment, only control lines and information lines that are considered as necessary for description are illustrated, and all the control lines and information lines of a product are not necessarily illustrated. All of the configurations of the embodiment may be connected to each other.

What is claimed is:

1. A network system, comprising:
   at least one wireless base station; and
   at least one slice management apparatus,
   the at least one wireless base station including:
   at least one edge device configured to process data received through wireless communication from a wireless terminal; and
   at least one DNS server configured to control communication for a network slice in the at least one wireless base station; and
   the at least one slice management apparatus being configured to manage resource management information for managing setting information comprising values to be set for the network slice that is to be generated in the at least one wireless base station in order to generate the network slice having a plurality of network slice characteristics including a type of the network slice, the values comprising at least one of an upper threshold value of a latency and a lower threshold value of a communication speed,
   the network slice being generated by dividing a network implemented by the at least one wireless base station,
   the values including identification information on the at least one edge device disposed in the network slice,
   the at least one slice management apparatus being configured to execute:
   first processing for generating, in a case where a network slice generation request including the plurality of network slice characteristics of the network slice is received, the network slice by dividing the network implemented by the at least one wireless base station;

second processing for referring, based on the plurality of network slice characteristics of the network slice included in the network slice generation request, to the resource management information to determine the values for the network slice and transmitting, to the at least one wireless base station, first setting information for setting the determined values for the network slice; and third processing for associating identification information on the wireless terminal that communicates through the generated network slice and identification information on the at least one edge device disposed in the network slice with each other, to thereby generate a transfer rule for a data transmitted from the wireless terminal addressed to the network slice for transferring the data to the at least one edge device in the network slice, and transmitting, to the at least one wireless base station, second setting information for setting the transfer rule based upon a transfer rule management information comprising a transmission source value of the wireless terminal and a destination value of the network slice.

2. The network system according to claim 1, wherein the at least one slice management apparatus is configured to determine, in the first processing, a domain name and an IP address to be set for the at least one edge device, and wherein the at least one slice management apparatus is configured to execute fourth processing for associating the determined domain name and the determined IP address with each other, to thereby generate setting information for transmitting, in a case where data including the domain name is received from the wireless terminal, the data to the at least one edge device through name resolution by the at least one DNS server, and transmitting the setting information to the at least one DNS server.

3. The network system according to claim 1, wherein the at least one slice management apparatus is configured to:

manage communication quality condition management information for managing a quality condition relating to a communication quality to be satisfied for each of the plurality of network slice characteristics;

obtain communication state information including a value relating to a communication quality of the at least one edge device;

refer to the communication quality condition management information to identify the quality condition corresponding to a characteristic of the network slice generated on the at least one communication facility;

determine, based on the communication state information, whether the quality condition corresponding to the characteristic of the network slice generated on the at least one wireless base station is satisfied; and execute the second processing and the third processing in a case where the quality condition corresponding to the characteristic of the network slice generated on the at least one wireless base station is not satisfied.

4. The network system according to claim 3, wherein the network system includes a plurality of edge devices as the at least one edge device, and wherein the at least one slice management apparatus is configured to:

select, in a case where the quality condition corresponding to the characteristic of the network slice generated on the at least one wireless base station is not satisfied, one of the plurality of edge devices to be included in the network slice based on the communication state information; and execute the second processing and the third processing.

5. A network slice generation method to be executed by a network system, the network system including:

at least one wireless base station; and at least one slice management apparatus, the at least one wireless base station including:

at least one edge device configured to process data received through wireless communication from a wireless terminal; and at least one DNS server configured to control communication for a network slice in the at least one wireless base station; and the at least one slice management apparatus being configured to manage resource management information for managing setting information comprising values to be set for the network slice that is to be generated in the at least one wireless base station in order to generate the network slice having a plurality of network slice characteristics including a type of the network slice, the values comprising at least one of an upper threshold value of a latency and a lower threshold value of a communication speed, the network slice being generated by dividing a network implemented by the at least one wireless base station, the values including identification information on the at least one edge device disposed in the network slice, the network slice generation method including:

a first step of executing, by the at least one slice management apparatus, first processing for generating, in a case where a network slice generation request including the plurality of network slice characteristics of the network slice is received, the network slice by dividing the network implemented by the at least one wireless base station;

a second step of executing, by the at least one slice management apparatus, second processing for referring, based on the plurality of network slice characteristics of the network slice included in the network slice generation request, to the resource management information to determine the values for the network slice and transmitting, to the at least one wireless base station, first setting information for setting the determined values for the network slice of the item; and a third step of executing, by the at least one slice management apparatus, third processing for associating identification information on the wireless terminal that communicates through the generated network slice and identification information on the at least one edge device disposed in the network slice with each other, to thereby generate a transfer rule for a data transmitted from the wireless terminal addressed to the network slice for transferring the data to the at least one edge device in the network slice, and transmitting, to the at least one wireless base station, second setting information for setting the transfer rule based upon a transfer rule management information comprising a transmission source value of the wireless terminal and a destination value of the network slice.

6. The network slice generation method according to claim 5, wherein the first processing includes determining a domain name and an IP address to be set for the at least one edge device, and wherein the network slice generation method further includes a step of executing, by the at least one slice management apparatus, fourth processing for associating the determined domain name and the determined IP address with each other, to thereby generate setting information for transmitting, in a case where data including the domain name is received from the wireless terminal, the data to the at least one edge device through name resolution by the at least one DNS server, and transmitting the setting information to the at least one DNS server.

7. The network slice generation method according to claim 5, further including:
　a step of managing, by the at least one slice management apparatus, communication quality condition management information for managing a quality condition relating to a communication quality to be satisfied for each of the plurality of network slice characteristics;
　a fourth step of obtaining, by the at least one slice management apparatus, communication state information including a value relating to a communication quality of the at least one edge device;
　a fifth step of referring, by the at least one slice management apparatus, to the communication quality condition management information to identify the quality condition corresponding to a characteristic of the network slice generated on the at least one wireless base station;
　a sixth step of determining, by the at least one slice management apparatus, based on the communication state information, whether the quality condition corresponding to the characteristic of the network slice generated on the at least one wireless base station is satisfied; and
　a seventh step of executing, by the at least one slice management apparatus, the second processing and the third processing in a case where the quality condition corresponding to the characteristic of the network slice generated on the at least one wireless base station is not satisfied.

8. The network slice generation method according to claim 7,
　wherein the network system includes a plurality of edge devices as the at least one edge device, and
　wherein the seventh step includes the steps of:
　selecting, by the at least one slice management apparatus, in a case where the quality condition corresponding to the characteristic of the network slice generated on the at least one wireless base station is not satisfied, one of the plurality of edge devices to be included in the network slice based on the communication state information; and
　executing, by the at least one slice management apparatus, the second processing and the third processing.

\* \* \* \* \*